2 Sheets—Sheet 1.

C. E. SNEIDER.

Breech-Loading Fire-Arm.

No. 9,166. Reissued April 20, 1880.

Witnesses,

W. A. Bertram.

Dr. L. H. Burdy.

Inventor,

C. E. SNEIDER.

by

R. D. Williams.

Attorney.

N. PETERS, PHOTO-LITHOGRAPHER, WASHINGTON, D. C.

C. E. SNEIDER.
Breech-Loading Fire-Arm.
No. 9,166. Reissued April 20, 1880.
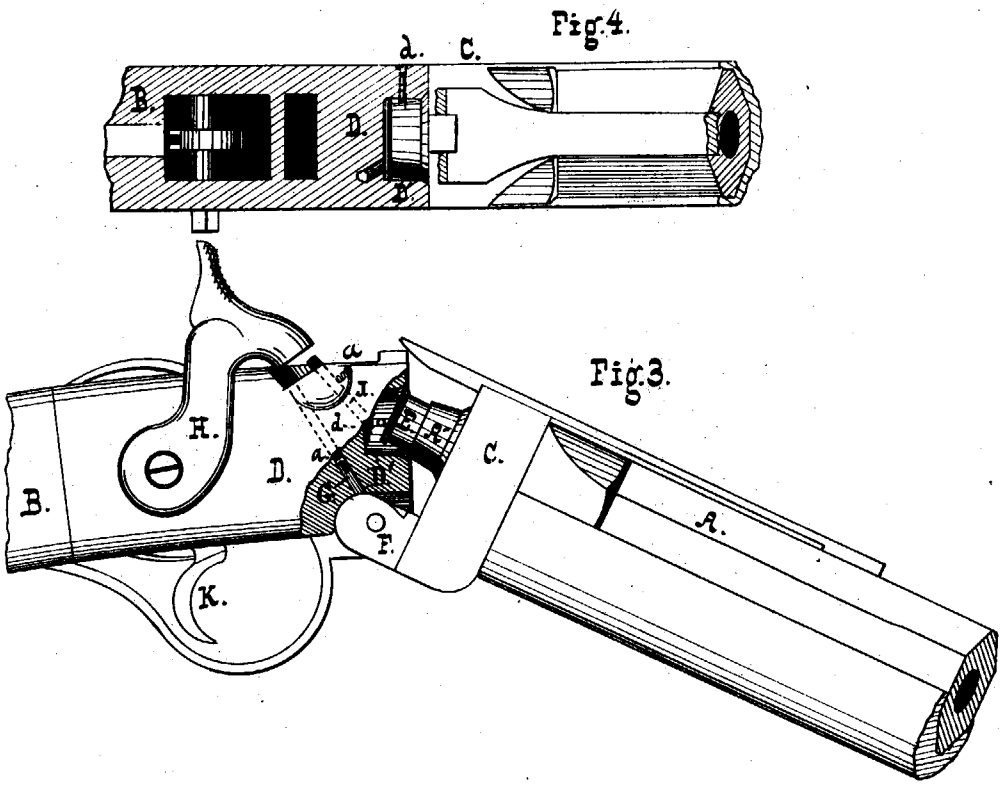
Witnesses,
W. A. Bertram.
De L. H. Barclay
Inventor,
C. E. SNEIDER
by
R. D. Williams.
Attorney.
N. PETERS, PHOTO-LITHOGRAPHER, WASHINGTON, D. C.

UNITED STATES PATENT OFFICE.

CHARLES EDWARD SNEIDER, OF BALTIMORE, MARYLAND.

BREECH-LOADING FIRE-ARM.

SPECIFICATION forming part of Reissued Letters Patent No. 9,166, dated April 20, 1880.

Original No. 47,755, dated May 16, 1865. Application for reissue filed March 9, 1880.

*To all whom it may concern:*

Be it known that I, CHARLES E. SNEIDER, of Baltimore city, State of Maryland, have invented certain new and useful Improvements in Breech-Loading Fire-Arms; and I hereby declare the same to be fully, clearly, and exactly described as follows, reference being had to the accompanying drawings, in which—

Figure 1:
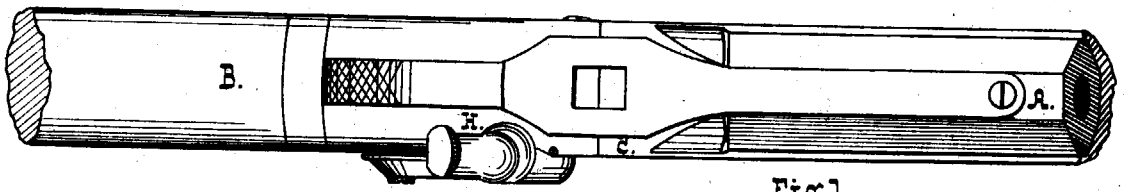
Figure 2:
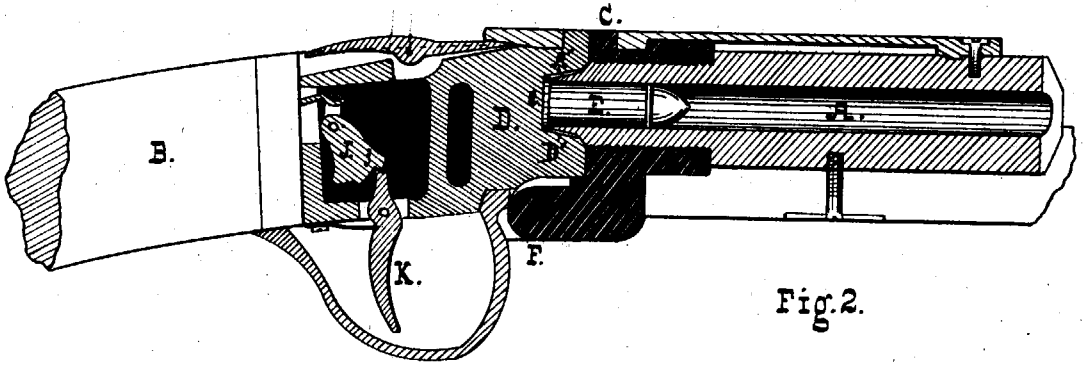

Figure 1 is a plan of a gun embodying my improvements. Fig. 2 is a vertical longitudinal sectional view of the same; Fig. 3, a side elevation, partly in section, and Fig. 4. a horizontal sectional view of the same.

One of the objects of my invention is to adapt the breech-loading gun known as "Smith's carbine" to be used with the primed metallic flanged cartridge instead of with the cartridge and percussion-cap now used in the same.

To this end I construct the barrel with a projection on its rear end, forming a chamber in continuation of the bore to receive the cartridge, and of such external shape as to admit of the lateral projection of the cartridge-flange, and facilitate the extraction of the exploded shell by the fingers.

The invention further consists in certain mechanism whereby, in the act of opening the breech, the hammer is lifted into engagement with a catch, as hereinafter set forth.

In the accompanying drawings, A is the barrel, B the stock, C the frame on the breech end of the barrel, and D the breech. The frame C is screwed upon the end of the barrel, as shown, and when the breech is closed rests against and forms a joint with the part D.

The rear end of the barrel is extended, as shown at A′, and this portion occupies a chamber, D′, when the barrel is in its closed position.

In loading, the cartridge E is pushed forward into the chamber until its flange *e* brings up against the rear side of the projection A′, which latter is tapered or flattened, so that the cartridge-flange will project laterally and admit of its being readily grasped by the fingers.

The walls of the chamber D′ afford a firm bearing for the projecting part A′, and sustain the strain incident upon the explosion.

While the described construction will, in most cases, admit of the empty shell being readily extracted, I have devised means for loosening or starting it as follows: A pin or screw, *d*, Fig. 3, projects a short distance into the chamber, and as the cartridge fits somewhat loosely in its chamber sufficient lateral play is afforded to enable the flange of the cartridge to pass the pin.

The expansion of the shell incident upon explosion causes the flange to catch upon the pin as the barrel is dropped, and the cartridge-shell is thereby started from its seat.

A spring or other similar or adequate appliance may be substituted for the pin, if desired.

Referring to the second part of my invention, F is a cam-lug, forming part of the hinge upon which the barrel turns, and is of such form as to impart, as the barrel is dropped down, a backward movement to the pin G, which presses upon the hammer and lifts it, causing a notch, *j*, on the tumbler J to engage with the trigger K, or sear, and hold the hammer in its retracted position. This admits of the firing-pin I being repressed by the base of the cartridge as the barrel is closed without danger of explosion, as the pin slides freely in a hole in the breech-piece.

The motions of the pins I G may be limited by means of small screws *a a*, that engage with slots in the pins.

I have considered it unnecessary here to refer to the mechanism for locking and releasing the barrel, as such forms no part of my invention, the salient features of which are made the subject of the following claims.

I am aware that long prior to my invention the hammers of breech-loading fire-arms were lifted in the act of opening the breech, and that this had been effected by means of a lug on the barrel, which engaged directly with the hammer, and also by means of a rod which was pivoted to the barrel and repressed the hammer. Such, therefore, I do not claim.

I claim—

1. In a drop-down breech-loader, a lug or cam attached to the barrel at the rear of the joint, and bearing upon a separate and detached rod, which engages with the hammer and lifts it as the breech is opened, substantially as described.

2. In a breech-loader, a cam or lug attached to the barrel, in combination with a pin sliding in a right line through a guiding-hole in the breech-piece of the weapon, and adapted to lift the hammer as the breech is opened, substantially as described.

3. In a breech-loader, a cam or lug located at and constituting a part of the pivotal attachment of the barrel to the breech, and adapted, as described, in connection with a detached bolt, to lift the hammer as the breech is opened, substantially as set forth.

4. The combination, in a breech-loader, of a hammer, firing-pin, push-rod, and cam, arranged and operating substantially as set forth, whereby the hammer is lifted into engagement with a catch as the breech is opened and the firing-pin is left free to be repressed by the cartridge-shell as the breech is closed.

CHARLES EDWARD SNEIDER.

Witnesses:
R. D. WILLIAMS,
M. GILLET GILL.